(12) United States Patent
McKay et al.

(10) Patent No.: US 7,476,715 B2
(45) Date of Patent: Jan. 13, 2009

(54) SUPPORTED ANTISTATIC POLYMERIZATION CATALYST

(75) Inventors: Ian McKay, Calgary (CA); Dusan Jeremic, Calgary (CA); Paul Mesquita, Calgary (CA); Grant Berent Jacobsen, Tervuren (BE); Sergio Mastroianni, Brussels (BE)

(73) Assignees: Nova Chemicals(International) S.A. (CH); Ineos Europe Limited (GB)

( * ) Notice: Subject to any disclaimer, the term of this patent is extended or adjusted under 35 U.S.C. 154(b) by 0 days.

(21) Appl. No.: 11/800,590

(22) Filed: May 7, 2007

(65) Prior Publication Data

US 2007/0282085 A1    Dec. 6, 2007

(30) Foreign Application Priority Data

May 30, 2006   (GB) ................................. 0610668.6

(51) Int. Cl.
*C08F 2/34* (2006.01)
(52) U.S. Cl. .......................... 526/74; 526/160; 526/134; 526/901; 526/943; 526/140
(58) Field of Classification Search ................... 526/74, 526/140, 160, 134, 901, 943
See application file for complete search history.

(56) References Cited

U.S. PATENT DOCUMENTS

| 6,462,161 | B1 * | 10/2002 | Cady et al. | 526/348 |
| 6,518,385 | B1 * | 2/2003 | Chai | 526/348.2 |
| 6,642,339 | B1 * | 11/2003 | Chai et al. | 526/348.1 |
| 6,703,340 | B2 * | 3/2004 | Yang et al. | 502/152 |

OTHER PUBLICATIONS

Joseph B. Lambert, et al., Silyl Cations in the Solid and in Solution, Organometallics, Depts. of Chem., Northwestern Univ., Evanston, IL, USA, Jan. 1994, vol. 13, pp. 2430-2443.
Joseph B. Lambert, et al, Tetrakis (pentaflourophenyl) borate: a New Anion . . . , Chem Society, Chem Community, Dept. of Chem, Northwestern Univ, Evanston, IL, USA, 1993, p. 383.

* cited by examiner

*Primary Examiner*—Ling-Siu Choi
(74) *Attorney, Agent, or Firm*—Kenneth H. Johnson

(57) ABSTRACT

The use of high activity "Single Site" polymerization catalysts often causes the fouling of polymerization reactors. The problem is particularly acute with gas phase polymerizations. While not wishing to be bound by theory it is believed that the fouling is initiated by the buildup of static charges in the reactor. The use of anti-static agents mitigates this problem, but typical antistatic agents contain polar species, which can deactivate the polymerization catalyst. We have now discovered that the use of a porous metal oxide support allows large levels of a selected antistatic agent to be used in a manner that reduces static/fouling problems in highly active polymerization catalysts.

8 Claims, No Drawings

SUPPORTED ANTISTATIC POLYMERIZATION CATALYST

BACKGROUND OF THE INVENTION

The polymerization of olefins using supported catalyst systems is well known. It will also be recognized by those skilled in the art that the use of such supported catalysts is often associated with the development of static charges within the polymerization reactor and subsequent reactor fouling, particularly in gas phase or slurry polymerization reactors. Severe reactor fouling may cause such problems as poor heat transfer; the formation of polymer agglomerates or sheets which adhere to the reactor walls; plugging of the polymer discharge system; and in severe cases, the development of large "chunks" which can force a reactor shut down.

Efforts to mitigate reactor fouling problems are widely reported in the patent literature.

The use of a salt of a carboxylic acids, especially aluminum stearate, as an antifouling additive to olefin polymerization catalyst compositions is disclosed in U.S. Pat. No. 6,271,325 (McConville et al.; to Univation); and U.S. Pat. No. 6,281,306 (Oskam et al.; to Univation).

The preparation of supported catalysts using an amine antistatic agent, such as the fatty amine sold under the trademark KEMANINE AS-990, is disclosed in U.S. Pat. No. 6,140,432 (Agapiou et al.; to Exxon) and U.S. Pat. No. 6,117,955 (Agapiou et al.; to Exxon).

Antistatic agents are commonly added to aviation fuels to prevent the buildup of static changes when the fuels are pumped at high flow rates. The use of these antistatic agents in olefin polymerizations is also known.

For example, an aviation fuel antistatic agent sold under the trademark STADIS™ composition (which contains a "polysulfone" copolymer, a polymeric polyamine and an oil soluble sulfonic acid) was originally disclosed for use as an antistatic agent in olefin polymerizations in U.S. Pat. No. 4,182,810 (Wilcox, to Phillips Petroleum). The examples of the Wilcox '810 patent illustrate the addition of the "polysulfone" antistatic agent to the isobutane diluent in a commercial slurry polymerization process. This is somewhat different from the teachings of the earlier referenced patents—in the sense that the carboxylic acid salts or amine antistats of the other patents were added to the catalyst, instead of being added to a process stream.

The use of "polysulfone" antistatic composition in olefin polymerizations is also subsequently disclosed in:

1) chromium catalyzed gas phase olefin polymerizations, in U.S. Pat. No. 6,639,028 (Heslop et al.; assigned to BP Chemicals Ltd.);

2) Ziegler Natta catalyzed gas phase olefin polymerizations, in U.S. Pat. No. 6,646,074 (Herzog et al.; assigned to BP Chemicals Ltd.); and 3) metallocene catalyzed olefin polymerizations, in U.S. Pat. No. 6,562,924 (Benazouzz et al.; assigned to BP Chemicals Ltd.).

The Benazouzz et al. patent does teach the addition of STADIS™ antistat agent to the polymerization catalyst in small amounts (about 150 ppm by weight).

However, in each of the Heslop et al. '028, Herzog et al. '074 and Benazouzz et al. '924 patents listed above, it is expressly taught that it is preferred to add the STADIS™ antistat directly to the polymerization zone (i.e. as opposed to being an admixture with the catalyst).

We have discovered that supported olefin polymerization catalysts prepared with large amounts of a polysulfone-containing antistat provide surprisingly good polymerization activity and excellent antistatic performance.

SUMMARY OF THE INVENTION

The present invention provides an olefin polymerization catalyst comprising a porous metal oxide, a transition metal catalyst system and an antistatic additive, wherein said antistatic additive comprises a polysulfone and a solvent for said polysulfone and wherein said catalyst is further characterized in that said antistatic additive is added to said porous metal oxide in an amount of from 5,000 to 50,000 parts per million by weight based on the weight of said porous metal oxide.

DETAILED DESCRIPTION OF THE PREFERRED EMBODIMENTS

Part A: Catalyst System

As used herein, the phrase "catalyst system" includes at least one "transition metal catalyst" (also referred to herein as a "catalyst compound") and may also include a cocatalyst or activator.

As used herein, the phrase "catalyst compound" includes any compound that, once appropriately activated, is capable of catalyzing the polymerization or oligomerization of olefins. The catalyst compound comprises at least one Group 3 to Group 15 metal atom (preferably a Group 4 to 12 transition metal, most preferably titanium, zirconium or hafnium) or lanthanide or actinide atom.

Thus, the catalyst compound may include for example, the well-known "chromium" polymerization catalysts (which are typically prepared by depositing a chromium species on a metal oxide support the group consisting of silica and alumina.

"Ziegler Natta" polymerization catalysts may also be employed. These catalysts typically comprise a group 4 or group 5 metal—especially titanium or vanadium—in combination with hydrocarbyl aluminum activator of the general formula:

$$Al(R^{a1})_a(OR^{b1})_b(X)_c$$

where $R^{a1}$ is a hydrocarbyl group having from 1 to 10 carbon atoms; $OR^{b1}$ is an alkoxy or aryloxy group where $OR^{b1}$ is a hydrocarbyl fragment having from 1 to 10 carbon atoms and being bonded to oxygen; X is chloride or bromide and a+b+c=3, with the proviso that a is greater than 0. Examples of the hydrocarbyl aluminum activator in widespread use include trimethyl aluminum, trimethyl aluminum and tributyl aluminum.

However, it is preferred to use a well characterized organometallic compound as the catalyst compound in the process of this invention. These catalyst compounds typically comprise a metal atom, at least one "functional" ligand and at least one leaving group. Further details follow.

As used herein, the phrase "leaving group" generally refers to one or more chemical moieties bound to the metal center of the catalyst compound that can be abstracted from the catalyst compound, thus producing a species active towards olefin polymerization or oligomerization.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, a "hydrocarbyl" includes aliphatic, cyclic, olefinic, acetylenic and aromatic radicals (i.e. hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —$CH_3$ group ("methyl") and a $CH_3CH_2$— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, anthracene, etc. For example, a $C_6H_5^-$ aromatic structure is an "phenyl", a $C_6H_4^{2-}$ aromatic structure is an "phenylene". An "arylalkyl" group is an alkyl group having an aryl group pendant therefrom, examples of which include benzyl, phenethyl, tolylmethyl and the like; an "alkylaryl" is an aryl group having one or more alkyl groups pendant therefrom, examples of which include tolyl, xylyl, mesityl, cumyl and the like.

As used herein, an "alkylene" includes linear, branched and cyclic hydrocarbon radicals deficient by two hydrogens. Thus, —$CH_2$— ("methylene") and —$CH_2CH_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non-carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, "non-interfering" means that the ligand (or cation) being referred to does not interfere with olefin polymerization (i.e. that it does not reduce the activity of olefin polymerization by more than 50% in comparison to a polymerization conducted in the absence of the ligand or cation).

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 15 atoms) and a ligand or ligand atom (e.g. cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

Part B: Transition Metal Catalyst (Or Catalyst Compound

In general, any transition metal catalyst compound which is activated by an aluminum alkyl or methyl aluminoxane (MAO), or an "ionic activator" (discussed in Part C, below) is potentially suitable for use in the present invention. An extensive discussion of such catalysts is provided in U.S. Pat. No. 6,720,396 (Bell et al.; assigned to Univation Technologies) and the references cited therein (disclosure to all of which is incorporated herein by reference). A general (non-limited) overview of such catalyst compounds follows. Such catalysts typically contain a "bulky" functional ligand. Preferred catalyst compounds are group 4 metal complexes (especially titanium or zirconium) which contain one cyclopentadienyl ligand ("homocyclopentadienyl complexes") or two cyclopentadienyl ligands ("biscyclopentadienyl complexes").

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, catalyst compounds are represented by the formula:

$$L^A L^B M Q_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of .eta.-bonding to M, preferably $.eta.^3$-bonding to M and most preferably $.eta.^5$-bonding. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a heterocyclopentadienyl ancillary ligand. Other $L^A$ and $L^B$ bulky ligands include but are not limited to bulky amides, phosphides, alkoxides, aryloxides, phosphinimides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methyl-bis(difluoromethyl)silyl, bromomethyldimethylgermyl and the like; and disubstituted boron radicals including dimethylboron for example; and disubstituted heteroatom radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. As used herein the term "leaving group" is any ligand that can be abstracted from a bulky ligand catalyst compound to form a bulky ligand catalyst species capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst compound is represented by the following formula:

$$L^A A L^B M Q_n \qquad (II)$$

These compounds represented by formula (II) are known as bridged, ligand catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, substituted chalcogen, or halogen or two or more R' may be joined to form a ring or ring system. In one embodiment, the bridged, ligand catalyst compounds of formula (II) have two or more bridging groups A.

In one embodiment, the catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

In a most preferred embodiment, catalyst compounds useful in the invention include bridged heteroatom, mono-bulky ligand compounds. More specifically, these highly preferred catalysts are group 4 metal (especially titanium) complexes characterized by having a bridged, bidentate cyclopentadienyl-amine ligand, as disclosed in the aforementioned U.S. Pat. No. 5,047,475. Preferred bridging groups are dialkyl silyls—especially dimethyl silyl. The amine portion of the ligand preferably has an alkyl substituent on the nitrogen atom (especially tertiary butyl) with the remaining nitrogen bands bonding to the transition metal (preferably titanium) and the silicon atome of the preferred dimethyl silyl bridging group. The cyclopentadienyl ligand is pi-bonded to the transition metal and covalently bonded to the bridging group. The cyclopentadienyl group is preferably substituted, especially tetra methyl cyclopentadienyl.

Preferred catalyst compounds include dimethylsilyltetramnethyl cyclopentadienyl-tertiary butyl amido titanium di chloride (and the alkyl analogues—i.e. with the two chloride ligands being replaced by simple alkyls, especially methyl) and the catalyst compounds illustrated in the present examples. U.S. Pat. Nos. 5,057,475 and 5,064,802 (are also illustrated in the present Examples).

In another embodiment, the catalyst compound is represented by the formula:

$$L^C AJMQ_n \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J may form a fused ring system. In an embodiment, $L^C$ of formula (III) is as defined above for $L^A$ in formula (I) and A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, catalyst compound is a complex of a metal, preferably a transition metal, a bulky ligand, preferably a substituted or unsubstituted pi-bonded ligand, and one or more heteroallyl moieties, such as those described in U.S. Pat. No. 5,527,752.

In another embodiment, the catalyst compounds are represented by the formula:

$$L^D MQ_2(YZ)X_n \quad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$—and —S—. Y is either C or S. Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand catalyst compounds are described in U.S. Pat. No. 5,637,660.

In one embodiment, the catalyst compounds are represented by the formula:

$$((Z)XA_t(YJ))_q MQ_n \quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the catalyst compounds include complexes of Ni$^{2+}$ and Pd$^{2+}$ described in U.S. Pat. No. 5,852,145. These complexes can be either dialkyl ether adducts, or alkylated reaction products of the described dihalide complexes that can be activated to a cationic state by the activators or cocatalysts are described below.

Also included as catalyst compounds are those diimine based ligands of Group 8 to 10 metal compounds.

Other suitable catalyst compounds are those Group 5 and 6 metal imido complexes described in U.S. Pat. No. 5,851,945, which is incorporated herein by reference. In addition, bulky ligand catalyst compounds include bridged bis(arylamido) Group 4 compounds, bridged bis(amido) catalyst compounds and catalysts having bis(hydroxy aromatic nitrogen ligands).

It is also contemplated that in one embodiment, the catalyst compounds of the invention described above include their structural or optical or enantiomeric isomers (meso and racemic isomers) and mixtures thereof.

Other catalyst compounds useful in this invention are disclosed in the aforementioned U.S. Pat. No. 6,720,396 (and references therein), reference to all of which is incorporated herein.

Part C: Activation

The above described transition metal catalysts are utilized for olefin polymerization in the presence of a cocatalyst or activator.

Aluminoxanes, especially methyl aluminoxane, are well known cocatalyst for organometallic catalyst compounds. Methyl aluminoxane, and near variants thereof (which typically contain small levels of higher alkyl groups) are commercially available products. Although the exact structure of these aluminoxanes is still somewhat uncertain, it is generally agreed that they are oligomeric species that contain repeating units of the general formula:

where R is (predominantly) methyl.

It is also well known to employ so-called "ionic activators" (also referred to herein as activator compounds) with organometallic catalyst compounds, as described in U.S. Pat. No. 5,198,401. In general, these activators comprise a cation and a substantially non-coordinating anion.

More specifically, preferred activator compounds contain a compatible anion having up to 100, and preferably up to 50 non-hydrogen atoms and having at least one substituent comprising an active hydrogen moiety. Preferred substituents comprising an active hydrogen moiety correspond to the formula:

wherein G is a polyvalent hydrocarbon radical, T is O, S, NR, or PR, wherein R is a hydrocarbyl radical, a trihydrocarbyl silyl radical, a trihydrocarbyl germyl radical, or hydrogen, H is hydrogen, q is 0 or 1, and preferably 1, and r is an integer from 1 to 3, preferably 1. Polyvalent hydrocarbon radical G has r+1 valencies, one valency being with a metal or metalloid of the Groups 5-15 of the Periodic Table of the Elements in the compatible anion, the other valency or valencies of G being attached to r groups T-H. Preferred examples of G include divalent hydrocarbon radicals such as: alkylene, arylene, aralkylene, or alkarylene radicals containing from 1 to 20 carbon atoms, more preferably from 2 to 12 carbon atoms. Suitable examples of G include phenylene, biphenylene, naphthylene, methylene, ethylene, 1,3-propylene, 1,4-butylene, phenylmethylene (—$C_6H_4$—$CH_2$—). The polyvalent hydrocarbyl portion G may be further substituted with radicals that do not interfere with the coupling function of the active hydrogen moiety. Preferred examples of such noninterfering substituents are alkyl, aryl, alkyl- or aryl-substituted silyl and germyl radicals, and fluoro substituents.

The group T-H in the previous formula thus may be an —OH, —SH, —NRH, or —PRH group, wherein R preferably is a $C_{1-18}$, preferably a $C_{1-10}$ hydrocarbyl radical or hydrogen, and H is hydrogen. Preferred R groups are alkyls, cycloalkyls, aryls, arylalkyls, or alkylaryls of 1 to 18 carbon atoms, more preferably those of 1 to 12 carbon atoms. The —OH, —SH, —NRH, or —PRH groups may be part of a larger functionality such as, for example, C(O)—OH, C(S)—SH, C(O)—NRH, and C(O)—PRH. Most preferably, the group T-H is a hydroxy group, —OH, or an amino group, —NRH.

Very preferred substituents $G_q(T-H)_r$ comprising an active hydrogen moiety include hydroxy- and amino-substituted aryl, aralkyl, alkaryl or alkyl groups, and most preferred are the hydroxyphenyls, especially the 3- and 4-hydroxyphenyl groups, hydroxytolyls, hydroxy benzyls (hydroxymethylphenyl), hydroxybiphenyls, hydroxynaphthyls, hydroxycyclohexyls, hydroxymethyls, and hydroxypropyls, and the corresponding amino-substituted groups, especially those substituted with —NRH wherein R is an alkyl or aryl radical having from 1 to 10 carbon atoms, such as for example methyl, ethyl, propyl, i-propyl, n-, i-, or t-butyl, pentyl, hexyl, heptyl, octyl, nonyl, and decyl, phenyl, benzyl, tolyl, xylyl, naphthyl, and biphenyl.

The compatible anion containing the substituent which contains an active hydrogen moiety, may further comprise a single Group 5-15 element or a plurality of Group 5-15 elements, but is preferably a single coordination complex comprising a charge-bearing metal or metalloid core, which anion is bulky. A compatible anion specifically refers to an anion which when functioning as a charge balancing anion in the catalyst system of this invention, does not transfer an anionic substituent or fragment thereof to the transition metal cation thereby forming a neutral transition metal compound and a neutral metal by-product. "Compatible anions" are anions that are not degraded to neutrality when the initially formed complex decomposes and are noninterfering with desired subsequent polymerizations. Preferred anions are those containing a single coordination complex comprising a charge-bearing metal or metalloid core carrying a substituent containing an active hydrogen moiety which anion is relatively large (bulky), capable of stabilizing the active catalyst species (the transition metal cation) which is formed when the activator compound and transition metal compound are combined and said anion will be sufficiently labile to be displaced by olefinic, diolefinic and acetylenically unsaturated compounds or other neutral Lewis bases such as ethers, nitriles and the like. Suitable metals for the anions of activator compounds include, but are not limited to, aluminum, gold, platinum and the like. Suitable metalloids include, but are not limited to, boron, phosphorus, silicon and the like. Activator compounds which contain anions comprising a coordination complex containing a single boron atom and a substituent comprising an active hydrogen moiety are preferred.

Preferably, compatible anions containing a substituent comprising an active hydrogen moiety may be represented by the following general Formula (I):

wherein M' is a metal or metalloid selected from Groups 5-15 of the Periodic Table of the Elements; Q independently in each occurrence is selected from the group consisting of hydride, dihydrocarbylamido, preferably dialkylamido, halide, hydrocarbyloxide, preferably alkoxide and aryloxide, hydrocarbyl, and substituted-hydrocarbyl radicals, including halo-substituted hydrocarbyl radicals, and hydrocarbyl- and halohydrocarbyl-substituted organo-metalloid radicals, the hydrocarbyl portion having from 1 to 20 carbons with the proviso that in not more than one occurrence is Q halide; G is a polyvalent, having r+1 valencies and preferably divalent hydrocarbon radical bonded to M' and T; T is O, S, NR, or PR, wherein R is a hydrocarbon radicals a trihydrocarbyl silyl radical, a trihydrocarbyl germyl radical, or hydrogen; m is an integer from 1 to 7, preferably 3; n is an integer from 0 to 7, preferably 3; q is an integer 0 or 1, preferably 1; r is an integer from 1 to 3, preferably 1; z is an integer from 1 to 8, preferably 1; d is an integer from 1 to 7, preferably 1; and n+z−m=d.

Preferred boron-containing anions that are particularly useful in this invention may be represented by the following general Formula (II):

wherein B is boron in a valence state of 3; z' is an integer from 1-4, preferably 1; d is 1; and Q, G, T, H, q, and r are as defined for Formula (I). Preferably, z' is 1, q is 1, and r is 1.

Illustrative, but not limiting, examples of anions of activator compounds to be used in the present invention are boron-containing anions such as triphenyl(hydroxyphenyl)borate, diphenyl-di(hydroxyphenyl)borate, triphenyl(2,4-dihydroxyphenyl)borate, tri(p-tolyl)(hydroxyphenyl)borate, tris-(pentafluorophenyl)(hydroxyphenyl)borate, tris-(2,4-dimethylphenyl)(hydroxyphenyl)borate, tris-(3,5-dimethylphenyl)

(hydroxyphenyl)borate, tris-(3,5-di-trifluoromethylphenyl)(hydroxyphenyl)borate, tris(pentafluorophenyl)(2-hydroxyethyl)borate, tris(pentafluorophenyl)(4-hydroxybutyl)borate, tris(pentafluorophenyl)(4-hydroxycyclohexyl)borate, tris(pentafluorophenyl)(4-(4'-hydroxyphenyl)phenyl)borate, tris(pentafluorophenyl)(6hydroxy-2-naphthyl)borate, and the like. A highly preferred activator complex is tris(pentafluorophenyl)(4-hydroxyphenyl)borate. Other preferred anions of activator compounds are those above mentioned borates wherein the hydroxy functionality is replaced by an amino NHR functionality wherein R preferably is methyl, ethyl, or t-butyl.

The cationic portion b.1) of the activator compound to be used in association with the compatible anion b.2) can be any cation which is capable of reacting with the transition metal compound to form a catalytically active transition metal complex, especially a cationic transition metal complex. The cations b.1) and the anions b.2) are used in such ratios as to give a neutral activator compound. Preferably the cation is selected from the group consisting of Bronsted acidic cations, carbonium cations, silylium cations, and cationic oxidizing agents.

Bronsted acidic cations may be represented by the following general formula:

$$(L-H)^+$$

wherein L is a neutral Lewis base, preferably a nitrogen, phosphorus, or sulfur containing Lewis base; and $(L-H)^+$ is a Bronsted acid. The Bronsted acidic cations are believed to react with the transition metal compound by transfer of a proton of said cation, which proton combines with one of the ligands on the transition metal compound to release a neutral compound.

Illustrative, but not limiting, examples of Bronsted acidic cations of activator compounds to be used in the present invention are trialkyl-substituted ammonium cations such as triethylammonium, tripropylammonium, tri(n-butyl)ammonium, trimethylammonium, tributylammonium, and tri(n-octyl)ammonium. Also suitable are N,N-dialkyl anilinium cations such as N,N-dimethylanilinium, N,N-diethylanilinium, N,N-2,4,6-pentamethylanilinium, N,N-dimethylbenzylammonium and the like; dialkylammonium cations such as di-(i-propyl)ammonium, dicyclohexylammonium and the like; and triarylphosphonium cations such as triphenylphosphonium, tri(methylphenyl)phosphonium, tri(dimethylphenyl)phosphonium, dimethylsulphonium, diethylsulphonium, and diphenylsulphonium.

Particularly suitable are those cations having longer alkyl chains such as dihexydecylmethylammonium, dioctadecylmethylammonium, ditetradecylmethylammonium, bis (hydrogenated tallow alkyl) methylammonium and similar.

Particular preferred activators of this type are alkylammonium tris (pentaflurorphenyl) 4-(hydroxyphenyl) borates. A particularly preferred activator is bis (hydrogenated tallow alkyl) methyl ammonium tris (pentafluorophenyl) (4-hydroxyphenyl) borate.

A second type of suitable cations corresponds to the formula: $C^+$, wherein $C^+$ is a stable carbonium or silylium ion containing up to 30 nonhydrogen atoms, the cation being capable of reacting with a substituent of the transition metal compound and converting it into a catalytically active transition metal complex, especially a cationic transition metal complex. Suitable examples of cations include tropyllium, triphenylmethylium, benzene(diazonium). Silylium salts have been previously generically disclosed in J. Chem. Soc. Chem. Comm., 1993, 383-384, as well as Lambert, J. B., et al., Organometallics, 1994, 13, 2430-2443. Preferred silylium cations are triethylsilylium, and trimethylsilylium and ether substituted adducts thereof.

Another suitable type of cation comprises a cationic oxidizing agent represented by the formula:

$$Ox^{e+}$$

wherein $Ox^{e+}$ is a cationic oxidizing agent having a charge of e+, and e is an integer from 1 to 3.

Examples of cationic oxidizing agents include: ferrocenium, hydrocarbyl-substituted ferrocenium, $Ag^+$ and $Pb^{2+}$.

The quantity of activator compound in the supported catalyst component and the supported catalyst is not critical, but typically ranges from 0.1, preferably from 1 to 2,000 micromoles of activator compound per gram of treated support material. Preferably, the supported catalyst or component contains from 10 to 1,000 micromoles of activator compound per gram of treated support material.

The supported catalyst component of the present invention as such or slurried in a diluent can be stored or shipped under inert conditions, or can be used to generate the supported catalyst of the present invention.

With respect to this type of activator, a particularly preferred compound is the reaction product of an alkylammonium tris (pentafluorophenyl)-4-(hydroxyphenyl) borate and an organometallic compound, for example trimethylaluminum.

Part D: Particulate Metal Oxide Support

The catalyst of this invention must be prepared with a particulate metal oxide support.

The use of metal oxide supports in the preparation of olefin polymerization catalysts is known to those skilled in the art. An exemplary list of suitable metal oxides includes oxides of aluminum, silicon, zirconium, zinc and titanium. Alumina, silica and silica-alumina are metal oxides that are well known for use in olefin polymerization catalysts and are preferred for reasons of cost and convenience. Silica is particularly preferred.

It is preferred that the metal oxide have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides that have comparatively high surface areas (greater than 1 $m^2/g$, particularly greater than 100 $m^2/g$, more particularly greater than 200 $m^2/g$) are preferred to non-porous metal oxides.

Highly preferred silica is further characterized by having a pore volume of from 0.1 to 5 mL/g (especially 0.5 to 3 mL/g). Average pore sizes of 50 to 500 Angstroms (Å) (especially 75 to 400 Å) are also preferred.

While not wishing to be bound by theory, it is believed that the high surface area of the preferred supports facilitates the incorporation of the high levels of antistatic agent (which are required by this invention) onto the support.

The support material may be subjected to a heat treatment and/or chemical treatment to reduce the water content or the hydroxyl content of the support material.

Typically chemical dehydration agents are reactive metal hydrides, aluminum alkyls and halides. Prior to its use the support material may be subjected to treatment at 100° C. to 1000° C. and preferably at 200 to 850° C. in an inert atmosphere under reduced pressure.

The support material may be further combined with an organoaluminum compound and most preferably a trialkylaluminum compound in a dilute solvent.

The support material is preferably pretreated with the trialkylaluminum compound at a temperature of 20° C. to 150° C. and preferably at 20° C. to 100° C.

The molar ration of transition metal in the catalyst compound (which transition metal is preferably titanium or zirconium) to ionic activator employed in the method of the present invention may be in the range 1:10000 to 100:1. A preferred range is from 1:5000 to 10:1 and most preferred from 1:10 to 10:1.

Part E: Antistatic "Polysulfone" Additive

The antistatic polysulfone additive comprises at least one of the components selected from:
(1) a polysulfone copolymer;
(2) a polymeric polyamine; and
(3) an oil-soluble sulfonic acid, and, in addition, a solvent for the polysulfone copolymer.

Preferably, the antistatic additive comprises at least two components selected from above components (1), (2) and (3). More preferably, the antistatic additive comprises a mixture of (1), (2) and (3).

According to the present invention, the polysulfone copolymer component of the antistatic additive (often designated as olefin-sulfur dioxide copolymer, olefin polysulfones, or poly(olefin sulfone)) is a polymer, preferably a linear polymer, wherein the structure is considered to be that of alternating copolymers of the olefins and sulfur dioxide, having a one-to-one molar ratio of the comonomers with the olefins in head to tail arrangement. Preferably, the polysulfone copolymer consists essentially of about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula —($C_x$ $H_{2x}$)—COOH wherein x is from 0 to about 17, and B is hydrogen or carboxyl, with the proviso that when B is carboxyl, x is 0, and wherein A and B together can be a dicarboxylic anhydride group.

Preferably, the polysulfone copolymer employed in the present invention has a weight average molecular weight in the range 10,000 to 1,500,000, preferably in the range 50,000 to 900,000. The units derived from the one of more 1-alkenes are preferably derived from straight chain alkenes having 6-18 carbon atoms, for example 1-hexene, 1-heptene, 1-octene, 1-decene, 1-dodecene, 1-hexadecene and 1-octadecene. Examples of units derived from the one or more compounds having the formula ACH=HB are units derived from maleic acid, acrylic acid, 5-hexenoic acid.

A preferred polysulfone copolymer is 1-decene polysulfone having an inherent viscosity (measured as a 0.5 weight percent solution in toluene at 30° C.) ranging from about 0.04 dl/g to 1.6 dl/g.

The polymeric polyamines that can be suitably employed in the process of the present invention are described in U.S. Pat. No. 3,917,466, in particular at column 6 line 42 to column 9 line 29.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, e.g. a mixture of xylene and isopropanol, adding a strong base, e.g. sodium hydroxide and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo™ 130" sold by Universal Oil Company.

According to the present invention, the oil-soluble sulfonic acid component of the process aid additive is preferably any oil-soluble sulfonic acid such as an alkanesulfonic acid or an alkylarylsulfonic acid. A useful sulfonic acid is petroleum sulfonic acid resulting from treating oils with sulfuric acid.

Preferred oil-soluble sulfonic acids are dodecylbenzenesulfonic acid and dinonylnaphthylsulfonic acid.

The antistatic additive preferably comprises 1 to 25 weight % of the polysulfone copolymer, 1 to 25 weight % of the polymeric polyamine, 1 to 25 weight % of the oil-soluble sulfonic acid and 25 to 95 weight % of a solvent. Neglecting the solvent, the antistatic additive preferably comprises about 5 to 70 weight % polysulfone copolymer, 5 to 70 weight % polymeric polyamine, and 5 to 70 weight % oil-soluble sulfonic acid and the total of these three components is preferably 100%.

Suitable solvents include aromatic, paraffin and cycloparaffin compounds. The solvents are preferably selected from among benzene, toluene, xylene, cyclohexane, fuel oil, isobutane, kerosene and mixtures thereof for instance.

According to a preferred embodiment of the present invention, the total weight of components (1), (2), (3) and the solvent represents essentially 100% of the weight of the antistatic additive.

One useful composition, for example, consists of 13.3 weight % 1:1 copolymer of 1-decene and sulfur dioxide having an inherent viscosity of 0.05 determined as above, 13.3 weight % of "Polyflo™ 130" (1:1.5 mole ratio reaction product of N-tallow-1,3-diaminopropane with epichlorohydrin), 7.4 weight % of either dodecylbenzylsulfonic acid or dinonylnaphthylsulfonic acid, and 66 weight % of an aromatic solvent which is preferably toluene or kerosene.

Another useful composition, for example, consists of 2 to 7 weight % 1:1 copolymer of 1-decene and sulfur dioxide having an inherent viscosity of 0.05 determined as above, 2 to 7 weight % of "Polyflo™ 130" (1:1.5 mole ratio reaction product of N-tallow-1,3-diaminopropane with epichlorohydrin), 2 to 8 weight % of either dodecylbenzylsulfonic acid or dinonylnaphthylsulfonic acid, and 78 to 94 weight % of an aromatic solvent which is preferably a mixture of 10 to 20 weight % toluene and 62 to 77 weight % kerosene.

According to a preferred embodiment of the present invention, the process aid additive is a material sold by Octel under the trade name STADIS™, preferably STADIS™ 450, more preferably STADIS™ 425.

The polysulfone additive composition is used in large quantity in the process of this invention. It is essential to use at least 5,000 parts per million of the additive composition (note: this weight is the total of all components, including the polysulfone copolymer, any polyamine, any oil soluble sulfonic acid and solvent).

It is preferred to use from 10,000 to 30,000 ppm of the mixed polymer antistatic composition sold under the trade name STADIS™.

Part F: Polymerization Process

Polymerization processes suitable for this include gas phase, slurry phase process; a high pressure process or a combination thereof.

In one embodiment, the process of this invention is directed toward a high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the polymerization process of the invention include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a solution polymerization process.

In another embodiment of the process of the invention, ethylene or propylene is polymerized with at least two different comonomers, optionally one of which may be a diene, to form a terpolymer.

In one embodiment, the invention is directed to a polymerization process for polymerizing propylene alone or with one or more other monomers including ethylene, and/or other olefins having from 4 to 12 carbon atoms. Polypropylene polymers may also be produced.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. No. 4,543,399, incorporated herein by reference.)

The reactor pressure in a gas phase process may vary from about 100 psig (690 kPa) to about 500 psig (3,448 kPa), preferably in the range of from about 200 psig (1,379 kPa) to about 400 psig (2,759 kPa), more preferably in the range of from about 250 psig (1,724 kPa) to about 350 psig (2,414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1,000 lbs/hr (455 Kg/hr), more preferably greater than 10,000 lbs/hr (4,540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2,000 lbs of polymer per hour (907 Kg/hr), more preferably greater than 5,000 lbs/hr (2,268 Kg/hr), and most preferably greater than 10,000 lbs/hr (4540 Kg/hr). In another embodiment the slurry reactor used in the process of the invention is producing greater than 15,000 lbs of polymer per hour (6,804 Kg/hr), preferably greater than 25,000 lbs/hr (11,340 Kg/hr) to about 100,000 lbs/hr (45,500 Kg/hr).

Further details are illustrated in the following non-limiting examples.

EXAMPLES

Part A—Catalyst Synthesis

Catalysts

Grace-Davison Sylopol 948 silica was calcined dehydrated at 250° C. under a nitrogen atmosphere for 5 hours, prior to use in the preparation of a "passified" silica (i.e. silica treated with triethyl aluminum, "TEAL") described in the following section.

(A.1) TEAL-Treated Silica ($SiO_2$/TEAL)

650 mL of dry, degassed heptane were added to a 1 L flask, followed by 11.25 mL of a 0.29 weight % solution of polysulfone/solvent antistatic additive sold under the trademark STADIS™ 425 (purchased from Octel Starrion L.L.C.) in heptane, and 150 g of calcined Sylopol 948 silica. The flask was placed on the rotating arm of a rotary evaporator and turned slowly for 15 minutes. 100 mL of a 25 weight (wt) % TEAL in hexane solution was added to the flask and then swirled by hand (Note: there is some heat evolution). 75 mL of 25 weight % TEAL in hexane was then added. The flask was then placed on the rotating arm of a rotary evaporator and turned slowly for 1 hour. The slurry was filtered. The filter cake was transferred back to the flask, reslurried in 350 mL of heptane and rotated for an additional 30 minutes. The slurry was filtered. The filter cake was transferred back to the flask, reslurried in 350 mL of heptane and rotated for an additional 30 minutes. The slurry was filtered a third time. The filter cake was transferred back to the flask, reslurried in 350 mL of heptane along with 11.25 mL of the 0.29 weight % solution of STADIS™ 425 in heptane. The flask was placed on the rotating arm of a rotary evaporator and turned slowly for 15 minutes. The solvent was then removed under vacuum while heating to 60° C. to reach a final vacuum of 300 millitorr.

(A.2) Preparation of Supported Catalyst (Method A—"Sequential" STADIS™ Addition)

Working in a glovebox under inert atmospheric conditions, 1.43 mL of a 9.58 weight % toluene solution of an activator (described in Part C of the preferred embodiments), namely $[(C_{18}H_{37})_2CH_3NH]\{(C_6F_5)_3B(C_6H_4OH)\}$) and 0.42 mL of 0.25 molar TEAL in toluene were mixed in a 100 mL round-bottomed flask and allowed to sit for 5 minutes. 1.61 g of $SiO_2$/TEAL (from A.1) was then added and the mixture was shaken on a Lab-Line Mistral Multi-Mixer at high speed for 1 hour. 1.08 mL of 8 weight % of a transition metal catalyst (or catalyst compound, as described in Part B of the preferred embodiments), namely (N-(tert-butyl)-1,1-di-p-tolyl-1-((1,2,3,3a,7a-η)-3-(1,3-dihydro-2H-isoindol-2-yl)1H-inden-1-yl)silanaminato-(2-)-N-)dimethyltitanium catalyst molecule in heptane was premixed with the 0.3 mL of hexene. The catalyst molecule/hexene solution was then added to the round bottom flask containing the support/activator material. The flask was then shaken for 1 hour. A (calculated) amount of a 0.29 weight % solution of STADIS™ 425 in heptane to achieve the targeted total antistatic agent concentration in the final product (as shown in Tables 1 and 2) was then added to the mixture followed by an additional 15 minutes of mixing. The flask was then placed under vacuum and dried to a residual pressure of 300 millitorr.

(A.3) Preparation of Supported Catalyst (Method B—"Simultaneous" STADIS™ Addition)

Working in a glovebox under inert atmospheric conditions, 1.43 mL of a 9.58 weight % toluene solution of $[(C_{18}H_{37})_2CH_3NH]\{(C_6F_5)_3B(C_6H_4OH)\}$ and 0.42 mL of 0.25 molar TEAL in toluene were mixed in a 100 mL round-bottomed flask and allowed to sit for 5 minutes. 1.61 9 of $SiO_2$/TEAL was then added and the mixture was shaken on a Lab-Line Mistral Multi-Mixer at high speed for 1 hour. 1.08 mL of 8 weight % (N-(tert-butyl)-1,1-di-p-tolyl-1-((1,2,3,3a,7a-η)-3-(1,3-dihydro-2H-isoindol-2-yl)1H-inden-1-yl)silanaminato-(2-)-N-)dimethyltitanium catalyst molecule in heptane was premixed with the 0.3 mL of hexene. A (calculated) amount of STADIS™ 425 to achieve the targeted total agent concentration in the final product was then added to the mixture (see Tables 1 and 2). The catalyst molecule/hexene/STADIS™ solution was then added to the round bottom flask containing the support/activator material. The flask was then shaken for 1 hour. The flask was then placed under vacuum and dried to a residual pressure of 300 millitorr.

Part B—Batch Polymerization

Ethylene polymerization experiments in Bench Scale Reactor were conducted on a 2 L, stirred, autoclave reactor in gas phase operation. Ethylene polymerizations were run at 80° C. for 60 minutes with a total operating pressure of 300 pounds per square inch gauge (psig) under homopolymerization conditions. Ethylene partial pressure was 120 psig and nitrogen constituted the remainder of the gas phase mixture (approximately 60 mole %). During reactor conditioning and setup, 0.4 mL of a 25 weight percent solution of tri-isobutylaluminum (TiBAL) was used as an impurity scavenger to assist with purification of reactor internals and the seedbed (150 g of high density polyethylene). Catalyst (See Table 1) was loaded into an injection tube under anaerobic conditions in a glovebox and was then connected to the reactor. A portion of the nitrogen used to make up the reactor gas composition was used to push the catalyst into the reactor at the start of polymerization.

TABLE 1

Catalysts Prepared for Bench Scale Reactor Tests

| Addition Method | STADIS ™ Concentration | | |
|---|---|---|---|
| | 400 ppm | 10,000 ppm | 19,600 ppm |
| Method A - Sequential Addition | Catalyst No. 1 | Catalyst No. 2 | Catalyst No. 3 |
| Method B - Simultaneous Addition | Catalyst No. 4 | Catalyst No. 5 | Catalyst No. 6 |

TABLE 2

Experimental Polymerization Results

| Catalyst | STADIS ™ Conc. (ppm) | Method of Addition | Activity[1] (gPE/mmol Ti—[$C_2^=$]-hr) | Productivity[2] (gPE/g) | Average Prod. |
|---|---|---|---|---|---|
| 1 | 400 | Sequential | 39759 | 484.6 | |
| 1 | 400 | Sequential | 36591 | 446.0 | 498.0 |
| 1 | 400 | Sequential | 46228 | 563.5 | |
| 2 | 10000 | Sequential | 29141 | 368.0 | |

TABLE 2-continued

Experimental Polymerization Results

| Catalyst | STADIS ™ Conc. (ppm) | Method of Addition | Activity[1] (gPE/mmol Ti—[$C_2^=$]-hr) | Productivity[2] (gPE/g) | Average Prod. |
|---|---|---|---|---|---|
| 2 | 10000 | Sequential | 36038 | 455.1 | 428.5 |
| 2 | 10000 | Sequential | 36624 | 462.5 | |
| 3 | 19600 | Sequential | 31549 | 382.7 | |
| 3 | 19600 | Sequential | 37663 | 456.9 | 407.5 |
| 3 | 19600 | Sequential | 31576 | 383.0 | |
| 4 | 400 | Simultaneous | 32557 | 413.0 | |
| 4 | 400 | Simultaneous | 36938 | 468.6 | 417.3 |
| 4 | 400 | Simultaneous | 29191 | 370.2 | |
| 5 | 10000 | Simultaneous | 39957 | 480.0 | |
| 5 | 10000 | Simultaneous | 38564 | 463.3 | 481.8 |
| 5 | 10000 | Simultaneous | 41791 | 502.0 | |
| 6 | 19600 | Simultaneous | 57721 | 712.0 | |
| 6 | 19600 | Simultaneous | 38309 | 472.5 | 507.1 |
| 6 | 19600 | Simultaneous | 27298 | 336.7 | |

Note:
[1] = grams of polyethylene/millimole titanium • atmosphere ethylene • hour
[2] = grams of polyethylene/gram of supported catalyst Statistical analysis confirms the excellent activity of the inventive catalysts. A limited summary of the statistical analysis is provided in Table 3.

TABLE 3

Double Sided t-tests of the Polymerization Productivity Results

| | Loading | Mean Productivity | Standard Deviation | Variance | Nobs | Description |
|---|---|---|---|---|---|---|
| Sequential Addition | | | | | | |
| 1 | 400 | 498 | 60 | 3587 | 3 | |
| 2 | 10000 | 429 | 53 | 2762 | 3 | |
| 3 | 19600 | 408 | 43 | 1828 | 3 | |
| Simultaneous Addition | | | | | | |
| 4 | 400 | 417 | 49 | 2434 | 3 | |
| 5 | 10000 | 482 | 19 | 377 | 3 | |
| 6 | 19600 | 507 | 190 | 36109 | 3 | |

| | 2 Sided t Tests | Pooled Variance | Calculated t | Tabulated t for 95% Confidence | DofF | Significantly Different |
|---|---|---|---|---|---|---|
| Sequential Addition | 1 vs. 2 | 3174 | 1.5108 | 2.776 | 4 | no |
| | 1 vs. 3 | 2707 | 2.1302 | 2.776 | 4 | no |
| | 2 vs. 3 | 2295 | 0.5369 | 2.776 | 4 | no |
| Simultaneous | 4 vs. 5 | 1406 | −2.1071 | 2.776 | 4 | no |
| | 4 vs. 6 | 19271 | −0.7923 | 2.776 | 4 | no |
| | 4 vs. 6 | 18243 | −0.2294 | 2.776 | 4 | no |
| Sequential vs. Simultaneous | 1 vs. 4 | 3011 | 1.8028 | 2.776 | 4 | no |
| | 2 vs. 5 | 1569 | −1.6458 | 2.776 | 4 | no |
| | 3 vs. 6 | 18968 | −0.8851 | 2.776 | 4 | no |

Part C—TSR Polymerization

Continuous, ethylene-hexene gas phase copolymerization experiments were conducted in a larger 70L Technical Scale Reactor (TSR) in continuous gas phase operation. Ethylene polymerizations were run at 80° C. with a total operating pressure of 300 pounds per square inch gauge (psig). Gas phase compositions for ethylene and hexene were controlled via closed-loop process control to values of 50.0 and 0.22 mole percent, respectively. Hydrogen was metered into the reactor in a molar feed ratio of 0.00215 relative to ethylene feed during polymerization. Nitrogen constituted the remainder of the gas phase mixture (approximately 49 mole %). Typical production rate for these conditions is 2 to 2.5 of polyethylene per hour.

The catalyst metering device used for administering catalyst to the reactor is equipped with a probe that measures electrostatic charge carried by the solid material passing through a monitored tube leading catalyst to the reactor.

Two catalysts were tested on the catalyst metering system of the Technical Scale Reactor (corresponding to catalyst 1 and catalyst 3 from Table 1).

The probe did not detect electrostatic charge (during a "control" run when no catalyst was passing through the tube). A large static charge was observed by the probe when catalyst 1 was passing through the tube. The probe detected substantively less electrostatic charge when catalyst 3 was passing through the tube.

Two catalysts (corresponding catalysts 3 and 6 from Table 1) were tested for five days in the Technical Scale Reactor under continuous copolymerization conditions. Catalyst 3 was successfully used to produce hexene/ethylene copolymer for 33 hours. Then, without interrupting the copolymerization a transition was made to the catalyst 6 and polymerization was conducted for 60 more hours. No substantial reactor fouling or agglomeration formation was observed during the experiment. In contrast, comparative experiments with catalyst 1 typically produced enough fouling to force termination of the polymerization reactions after several hours and in some cases it was not even possible to establish stable polymerization with catalyst 1 due to static/fouling conditions.

What is claimed is:

1. An olefin polymerization catalyst comprising a porous metal oxide, a transition metal catalyst system and an antistatic additive, wherein said antistatic additive comprises a polysulfone and a solvent for said polysulfone and wherein said catalyst is further characterized in that said antistatic additive is added to said porous metal oxide in an amount of from 5,000 to 50,000 parts per million by weight based on the weight of said porous metal oxide; further characterized in that said porous metal oxide is silica having a pore volume of from 0.1 to 5 mL/g.

2. The catalyst of claim 1 wherein said transition metal catalyst system comprises an organometallic catalyst compound and an activator.

3. The catalyst of claim 1 wherein said organometallic catalyst compound is a group 4 metal complex selected from the group consisting of monocyclopentadienyl complexes and bis (cyclopentadienyl) complexes.

4. The catalyst of claim 2 wherein said organometallic catalyst compound comprises a group 4 metal complex characterized by having a bridged, bidentate cyclopentadienyl-amine ligand.

5. The catalyst of claim 2 wherein said activator is an ionic activator comprising a single boron atom and a substituent comprising an active hydrogen moiety.

6. A process for polymerizing at least one olefin selected from the group consisting of $C_2$ to $C_{10}$ alpha olefins in a polymerization reactor with an olefin polymerization catalyst comprising a polysulfone and a solvent for said polysulfone and wherein said catalyst is further characterized in that said antistatic additive is added to said porous metal oxide in an amount of from 5,000 to 50,000 parts per million by weight based on the weight of said porous metal oxide; further characterized in that said porous metal oxide is silica having a pore volume of from 0.1 to 5 mL/g.

7. The process of claim 6 wherein said transition metal catalyst system comprises an organometallic catalyst compound and an activator.

8. The process of claim 7 wherein said reactor is a gas phase reactor.

* * * * *